Oct. 31, 1939.　　　H. W. HAPMAN　　　2,178,341
CHAIN CONVEYER
Filed July 28, 1938
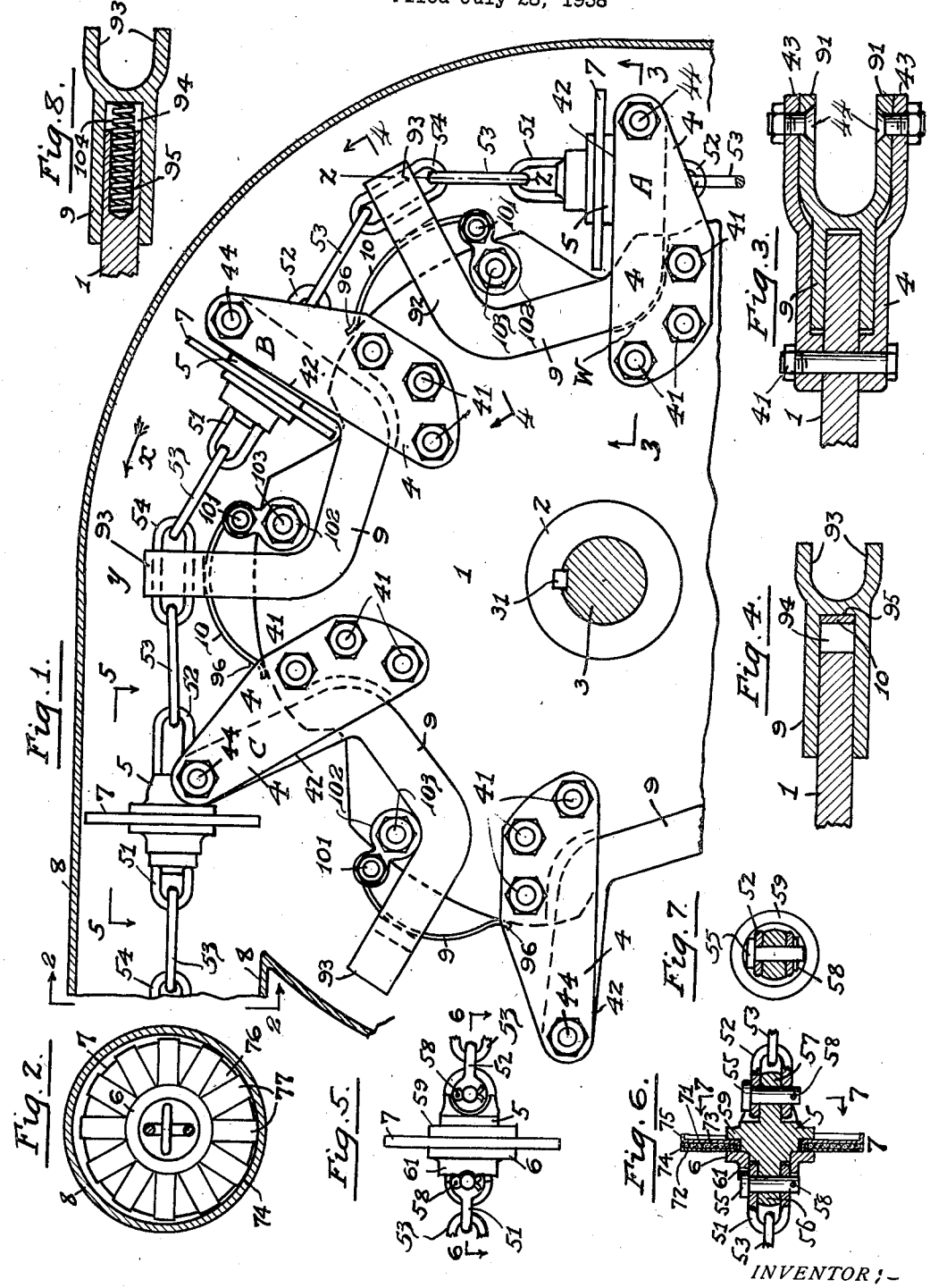
INVENTOR:—
Henry W. Hapman

Patented Oct. 31, 1939

2,178,341

UNITED STATES PATENT OFFICE 2,178,341

CHAIN CONVEYER

Henry W. Hapman, Detroit, Mich.

Application July 28, 1938, Serial No. 221,697

2 Claims. (Cl. 198—172)

My invention relates to conveyers of the "flight" type in which loose, granular, or pulverulent material is propelled along the interior of a pipe or casing by means of a series of moving elements arranged in co-operative relation with a propelling chain, and its principal object is to provide a conveyer of the character referred to by which material may be carried with equal efficiency in a horizontal, vertical, or inclined direction as well as around curves arranged in vertical or horizontal planes.

Another object of my invention is to provide a conveyer in which the weight of the propelling chain and the associated flights is supported by frictional contact of the flight members upon the internal surface of the pipe or casing, so that no sprockets are necessary upon corners or curves with the exception of a single sprocket at the driving point, by which arrangement the conveyor may be disposed in various directions around a desired circuit by merely bending the pipe or casing to correspond thereto.

A further object of my said invention is to provide a driving sprocket having resilient means intermediate the teeth by which slack in the propelling chain, due to wear and other causes, is automatically taken up and release of the flight members from the said teeth is greatly facilitated.

Another object of my invention is to provide a conveyer in which the flight members are mounted upon the propelling chain in such manner as to be rotatable in relation thereto, whereby the wear is distributed around the inner periphery of the casing and the cutting of grooves or ridges therein is prevented.

Another object of my invention is to provide a conveyer in which the propelling chain is for the most part of the ordinary "coil" or link construction so that it may be built up to any desired length in a rapid and simple manner and also quickly disassembled and re-arranged to adapt it to changes in the length and direction of the casing.

With these and other objects in view, I will now describe a preferred embodiment of my invention, reference being had to the accompanying drawing, in which—

Figure 1 is a fragmentary elevational view showing the driving sprocket together with a portion of the propelling chain and the associated flight members.

Figure 2 is a transverse section taken on line 2—2 of Figure 1 showing the casing and one of the flight members.

Figure 3 is a section taken on line 3—3 of Figure 1 illustrating the construction of the teeth or propelling members of the sprocket.

Figure 4 is a section taken on line 4—4 of Figure 1 showing the resilient means for taking up slack in a propelling chain and assisting its release from the sprocket.

Figure 5 is a plan view taken on line 5—5 of Figure 1 showing the construction of the flight-carrying member and the shackles for connecting it to the chain links.

Figure 6 is a longitudinal section taken on line 6—6 of Figure 5.

Figure 7 is a transverse section taken on line 7—7 of Figure 6, and

Figure 8 is a fragmentary sectional view corresponding to Figure 4 illustrating a modification of the resilient means for taking up slack of the propelling chain.

Like characters designate corresponding parts throughout the several views.

In the drawing 1 designates a flat disc, of cast iron or other suitable material, having a central hub 2 which is secured in driving relation with the shaft 3 as by the key 31, the shaft 3 constituting the drive shaft of the conveyer and receiving power through any suitable form of reduction gearing, not shown, by which rotation of the said disc is obtained in the direction indicated by the arrow $x$ in Figure 1. Secured to the disc 1 by bolts 41 are the driving teeth 4, in the present example six in number, which are arranged in equally spaced relation around the shaft 3 and have their forward faces 42 extending in a radial direction and have their ends bifurcated as indicated at 43 in Figure 3 so as to embrace the flight carriers 5, to be hereinafter described.

The propelling chain of the conveyer consists essentially of a series of flight carriers 5 which are provided with fore and aft shackles designated 51 and 52, respectively, and a series of intermediate links 53, 54 of ordinary oval or "coil" construction, the various elements being so proportioned that the distance between the flight carriers 5 corresponds substantially with the pitch of the sprocket teeth 4. The shackles 51, 52 are connected to the flight carriers 5 by pins 55 which engage lugs 56, 57 upon the carriers and are maintained in position by cotter pins 58, as shown clearly in the sectional view, Figure 6. Upon the carriers 5 are flanges 59 and in parallel spaced relation with these flanges are the collars 6, and between the said flanges and the collars are loosely held the flights 7. The flights 7 consist essentially of central discs 71 formed of fiber, rubber, or other soft material which are positioned between forward and rear discs 72, 73, respectively, the said discs being preferably of spring steel and having upon their inner peripheries complementary flanges arranged in telescopic relation, and upon their outer peripheries rearwardly extending flanges 74, 75. The flights are so proportioned that their inner peripheries fit loosely upon the co-acting peripheries of the carriers 5 and have also a slight amount of play in a longitudinal direction between the flanges 59 and the collars 6 so that the said flights may rotate freely about the axes of the carriers. The outer peripheral flanges 74, 75 are so proportioned as to have considerable play within the tubular casing 8 of the conveyer so as to facilitate rotational movement above referred to and also provide such clearance as will prevent jamming of the flights within the casing due to the choking action of the material to be conveyed.

The members 72, 73 which are above described as discs are preferably provided with a series of V-shaped notches 76 so as to constitute in fact a series of resilient radial arms 77 between which the central core 71 is confined, by which construction is provided a very flexible form of flight which is well adapted for rough usage and irregular stresses due to passing of the flights around curves, and so forth, while due to the fact that the flights 7 as a whole are free to rotate about the carriers 5, the wear upon the internal periphery of the casing 8 is well distributed and the formation of ridges therein by the ends of the radial arms 77 is entirely prevented. It will be observed that the hubs 61 of the flanges 6 are each notched to receive on one side the heads of the pins 55 and on the other side to similarly receive the tails of the said pins, by which arrangement the flanges 6 are maintained in proper position and at the same time may be quickly and easily removed by taking out the pins 55, as will be understood.

I will now describe the novel and effective means by which wear and stretch of the propelling chain and consequent inaccuracy of the pitch thereof is compensated for. Between the bifurcated extremities 43 of the driving teeth 4, as by the countersunk bolts 44, are secured the substantially U-shaped members 9, the outer ends of which are correspondingly bifurcated as indicated at 91 so as to provide for the passage therewithin of the flight carriers 5 as shown in Figure 3. The ends of the members 9 remote from their pivotal points extend in a radial direction as indicated at 92 and terminate in forks 93 which are adapted to engage the oval chain links 54 positioned intermediate the carriers. The members 9 are provided with a central opening 94 which embraces the flat sides of the disc 1, and between the said disc and the opposed face 95 of the said member is the leaf spring 10, one end of which is pivoted at 101 to a pair of shackles 102, secured to the disc by bolts 103, while the other end 96 abuts upon the outer periphery of the disc, the result being that the links 54 are yieldingly pressed outwards from the center of the sprocket and serve to take up any slack in the chain and at the same time assist in the disengagement of the members 5 from the sprocket teeth 4 when they arrive at the point y as indicated in Figure 1.

In order to make clear the action of the springs 10, it will be seen from the drawing, Figure 1, that the working face 42 of the sprocket tooth 4 on the extreme right hand, designated A, is in alignment with the adjacent inner face of the U-shaped member 9, while it will be seen by observing the sprocket tooth B that the inner face of the last-named member is slightly above the inner face 42 of the tooth, while in the case of the sprocket tooth C the inner face of the U-shaped member is still further removed from the said inner face 42. This movement of the U-shaped members in relation to the sprocket teeth obviously exerts a very powerful leverage tending to remove the flange 59 of the flight carrier 5 away from the tooth 4 so that the two parts are easily disengaged as the flight advances towards the point Y in the Figure 1. It will be observed further that since the pressure along the radial arm 92 of the member 9 is proportionate to the sine of the angle between it and the tangential line Z—Z of the propelling chain, the force which must be exerted by the spring 10 is relatively small in relation to the pull upon the driving chain. In order to limit the swinging movement of the member 9 around its pivot 44 and prevent such movement from becoming excessive due to centrifugal force, the said member in its outer movement abuts upon the external periphery of the shackles 102, as shown to the left hand side of Figure 1. Inward movement of the member 9 is prohibited by the contact of its outer surface against the inner surface of the cavity W in the member 4, as will be seen on reference to the right hand tooth of the sprocket.

In Figure 8 of the drawing, I have shown a modification of the design in which a helical compression spring 104 is substituted for the leaf spring 10, the said spring being positioned within a circular cavity 95 in the member 9.

While I have herein described and shown a preferred embodiment of my invention, it will be readily understood by those skilled in the art to which the same relates that various changes in detail may be made to suit particular requirements without departing from the spirit of my invention as defined in the appended claims.

Having thus described my said invention, what I claim and desire to secure by Letters Patent of the United States is:

1. In a conveyer of the character described, the combination, with a flight consisting of a plate of soft material interposed between a pair of resilient metallic members having opposed central flanges arranged in telescopic relation and defining a bore, of a flight carrier having a cylindrical portion fitting within said bore and having flanges adapted to engage the front and rear faces of said flight, said carrier having front and rear terminal loops for connection to adjacent chain links, whereby a series of carriers may be assembled with said links to form a continuous propelling member.

2. In a conveyer of the character described, the combination, with a flight consisting of a plate of soft material interposed between a pair of resilient metallic members having central flanges defining a bore and having peripheral flanges extending beyond the outer edge of said plate, of a flight carrier having a cylindrical portion fitting within said bore and having flanges adapted to engage the front and rear faces of said flight, said carrier having front and rear terminal loops for connection to adjacent chain links, whereby a series of carriers may be assembled with said links to form a continuous propelling member.

HENRY W. HAPMAN.